A. WALKER.
Seed-Sower.

No. 160,733.

Patented March 9, 1875.

Witnesses
John Grist, Junr.
John S. Grist.

Alexander Walker
Inventor
By Henry Grist
Attorney.

UNITED STATES PATENT OFFICE.

ALEXANDER WALKER, OF MORNINGTON, ASSIGNOR OF ONE-HALF HIS RIGHT TO GEORGE SUTHERLAND, OF LISTOWELL, CANADA.

IMPROVEMENT IN SEED-SOWERS.

Specification forming part of Letters Patent No. 160,733, dated March 9, 1875; application filed December 18, 1874.

*To all whom it may concern:*

Be it known that I, ALEXANDER WALKER, of the township of Mornington, in the county of Perth and Province of Ontario, Canada, have invented certain new and useful Improvements in Broadcast Seed-Sowers; and I do hereby declare that the following is a full, clear, and exact description of the same.

This device consists of a tubular seed-box, to be strapped to the arm of the operator below the elbow, and swung with the motion of the arm. A perforated head is applied to the discharge end of the tube, and said head has a conical wire-cloth covering projecting therefrom. Slides cover the perforated head, to regulate the quantity of grain sown.

Figure 1:
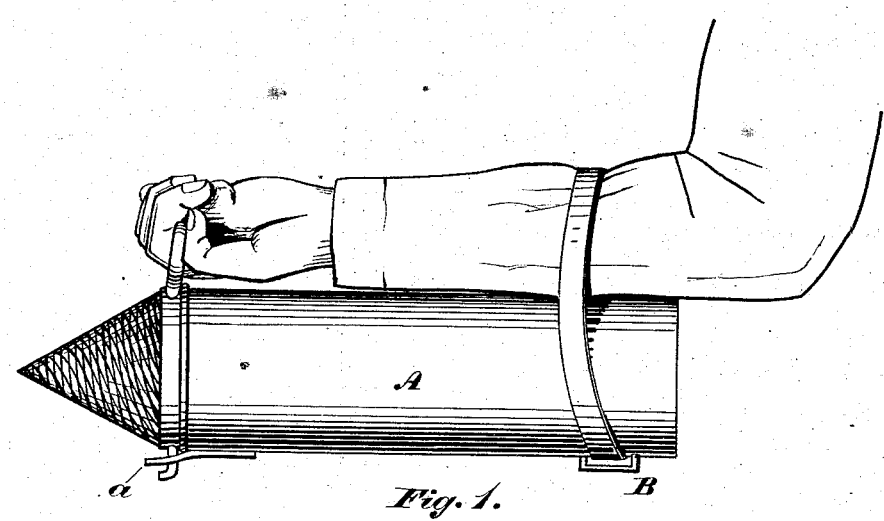
Figure 2:
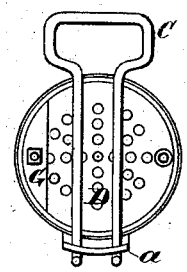
Figure 3:
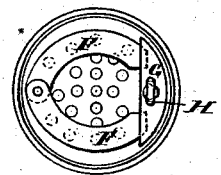

Figure 1 is a side view of my improved seed-sower. Fig. 2 is a front view of the perforated cap, the wire-cloth cone removed. Fig. 3 is a rear view of Fig. 2, showing the regulating-slides.

A is the seed-box or cylindrical tube, of any convenient form to contain the seed, and of suitable length to be fastened below the elbow of the arm of the user by a strap passing through a loop, B, secured to the tubular cylinder. C is a bow handle, attached to the circumference of the cylinder, or to its perforated head D, hereafter referred to, to receive the fingers of the sower, so that the device, in sowing, can be swung with the motion of the arm. The perforated head or cap D fits tightly over the end of the cylinder A, and is, with the cap D, hinged thereto, so as to be wholly removable, to allow the cylinder to be filled with seeds. The wire of the loop c, passing through holes in a lug, a, secured to the cylinder, forms the hinged connection; but any other convenient method may be adopted to secure the perforated cap removably. The cap D has a series of perforations or holes therein, through which the seed passes from the cylinder. This cap D is covered with a wire-cloth cone, E, through which the seed, in sowing, is distributed over the ground. Within the perforated cap D is pivoted thereto a pair of curved plates or cut-offs, F, which close together. G is a clamp, to fix the disks at any adjusted position to cover the perforations in the cap D more or less, to limit the quantity of seed to be distributed. The clamp G is held compressed against the disk by means of a thumb-screw, H.

I claim as my invention—

1. The seed-holder A, attachable to the arm of the operator by a strap, and provided with a handle, C, to be seized by the fingers of the operator when seeding, in the manner set forth.

2. The seed-holder A, having a perforated cap, D, and wire-cloth cone E, as and for the purpose set forth.

3. The cut-offs F, pivoted to the cap D, and held adjustably by the clamp G and screw H, as and for the purpose set forth.

ALEXR. WALKER.

Witnesses:
 GEORGE SUTHERLAND,
 HERBERT COULTER.